United States Patent
Truong et al.

(10) Patent No.: US 10,157,555 B2
(45) Date of Patent: Dec. 18, 2018

(54) RUGGEDIZED PLACARD

(71) Applicants: Samkol Truong, Foothill Ranch, CA (US); Robert P. Helstern, Irvine, CA (US)

(72) Inventors: Samkol Truong, Foothill Ranch, CA (US); Robert P. Helstern, Irvine, CA (US)

(73) Assignee: Optic Clear Solutions, LLC, Anaheim, CA (US)

( * ) Notice: Subject to any disclaimer, the term of this patent is extended or adjusted under 35 U.S.C. 154(b) by 33 days.

(21) Appl. No.: 15/166,183

(22) Filed: May 26, 2016

(65) Prior Publication Data

US 2017/0345349 A1 Nov. 30, 2017

(51) Int. Cl.

| G09F 15/00 | (2006.01) |
|---|---|
| B29C 69/02 | (2006.01) |
| B32B 27/00 | (2006.01) |
| G09F 1/02 | (2006.01) |
| B29C 53/04 | (2006.01) |
| B29C 59/02 | (2006.01) |
| B29K 33/00 | (2006.01) |
| B29K 105/00 | (2006.01) |
| B29L 31/00 | (2006.01) |
| B29C 53/84 | (2006.01) |

(52) U.S. Cl.
CPC .......... *G09F 15/0012* (2013.01); *B29C 69/02* (2013.01); *B32B 27/00* (2013.01); *G09F 1/02* (2013.01); *B29C 53/04* (2013.01); *B29C 53/84* (2013.01); *B29C 59/02* (2013.01); *B29K 2033/12* (2013.01); *B29K 2105/256* (2013.01); *B29L 2031/7232* (2013.01)

(58) Field of Classification Search
None
See application file for complete search history.

(56) References Cited

U.S. PATENT DOCUMENTS

| 5,182,148 A | 1/1993 | Kapp et al. |
|---|---|---|
| 5,466,756 A | 11/1995 | Roach et al. |
| 6,190,757 B1 * | 2/2001 | Nelson .................. B41M 5/395 347/217 |
| 7,964,269 B2 * | 6/2011 | Lee ........................ B41M 5/395 359/529 |
| 2003/0035917 A1 * | 2/2003 | Hyman .................... B41M 1/30 428/67 |
| 2007/0252300 A1 * | 11/2007 | Paplham ............. B29C 47/0021 264/108 |

\* cited by examiner

*Primary Examiner* — Kristina N Junge
(74) *Attorney, Agent, or Firm* — Paul D. Chancellar; Ocean Law

(57) ABSTRACT

A ruggedized placard utilizes a multilayer construction including a clear primary layer or cover and an indicia layer, the indicia being viewable through the clear primary layer.

12 Claims, 2 Drawing Sheets

RUGGEDIZED PLACARD

INCORPORATION BY REFERENCE

This application incorporates by reference, in their entireties and for all purposes, the disclosure of U.S. Pat. No. 5,466,756 concerning polymethylmethacrylate and cell cast polymethylmethacrylate, and U.S. Pat. No. 5,182,148 concerning colorants.

BACKGROUND OF THE INVENTION

Field of the Invention

The present invention relates to optics and optical devices. In particular, a multilayer placard withstands physical abuse while continuing to provide high visibility signage.

Discussion of the Related Art

It is known that placards are common place in numerous forms and applications within our society at large. These placards are found bearing information that is useful and helpful in our daily lives. Some placards provide us with advertising while others provide us information to what is dangerous and harmful.

It should be understood that placards exist for the betterment of society. It should also be understood that these placards can age/wear when placed into applications of extreme environmental exposure, a degraded placard can lose its ability to provide information.

Some examples of degradation can be generally described as corrosion, particularly if the placard is formed from metal. Crazing, blistering and the cracking characteristics of plastic placards are evidence of exposure to long durations of sunlight, specifically ultra-violet spectral irradiance. Moreover, placards bearing stamped or having painted indicia that can lose an ability to provide information due to high exposure wear.

Additionally, painted graffiti when applied can be most destructive to a placard's information and is often not mitigated or made resistant to by placard manufacturers. It is known that vandalism is another form of damage to the placard where vandals may disturb or destroy the placard's information by applying heavy scratches to the placard. Hence, it is a loss to society when a placard fails to provide information.

While modern day placards may be ubiquitous, placards designed for long term use is somewhat limited. Even more limited is the variety of long life placards intended for use in environments that subject the placard to physical abuse.

SUMMARY OF THE INVENTION

While many designs for placards exist and users are typically loathe to experiment with new and untested designs, applicants believe useful improvements provide, among other things, survivability of information carried by the placard. Embodiments of the present invention relate to the ruggedization of a placard for use in extreme environments as well as high wear applications. At least some embodiments of the present invention assure long lasting readability of the placard's indicia and survivability of the placard itself despite extreme weathering conditions including long periods of intense sunlight.

To promote improved readability, embodiments of the present invention manage reflective glare and can be tailored to provide glare management for numerous viewing situations. The present invention is not limited to size or configuration and can be applied as a direct replacement to many existing placard types and applications. Various embodiments of the present invention are easily cleaned with water and will not oxidize or corrode. The present invention resists deleterious actions of solvents, salt exposure and petroleum based fuels which make it ideal for the transportation industry, particularly heavy construction machinery.

Variations of the present invention can provide high impact resistance features to mitigate vandalism and can be coupled with other physical attributes such as pliability. In other words, the present invention can be applied to curved surfaces or formed to fit unusual surfaces.

Embodiments of the invention provide for managing transmitted light. For example, where an application requires backlighting the placard, selected colorants, plys, and zones used in a placard indicia layer provide solutions.

Wear mitigation of the placard's nomenclature is provided by a durable top sheet where the indicia is sandwiched between layers of polymethlymethacrylate and is sealed from environmental elements such as sand, dust or water.

The present invention can be sanded and polished as well as machined, cut or drilled for specialized mounting. Embodiments of the present invention provide long life placards able to withstand considerable abuse while continuing to present high visibility indicia that is clearly presented to observers.

An embodiment of the ruggedized placard is for use in physically abusive environments and comprises: a clear cover layer and an indicia layer; the cover layer cut from a sheet of cell-cast polymethylmethacrylate (PMMA) having a thickness in the range of 0.025 to 0.035 inches; the PMMA having 1 to 2 percent molecular cross-linking and formulated with an additive absorbing 95 percent or more of incident ultraviolet light; the cover layer having opposed inner and outer surfaces; the cover layer outer surface having a fine grain pattern finish that measures 75 to 80 gloss units (GU), the finish embossed on the cover surface during cell casting; the indicia layer built up on the cover layer inner surface; the indicia layer including a first colorant coating and a second colorant coating that is opaque, the first colorant coating applied directly to portions of the cover inner surface to form alphanumeric characters or symbols for viewing through the clear cover; portions of the cover inner surface not coated with the first colorant being coated with the second colorant.

The ruggedized placard may include a backing layer adhered to the indicia layer by an acrylic film adhesive. The ruggedized placard may include improved adhesive film adherence by mechanically pressing the placard layers together and heating the placard to a temperature that is 5 to 10 percent below the PMMA glass transition temperature. The ruggedized placard may utilize mechanical pressure that is not less than about 40 pounds per square inch and not more than about 60 pounds per square inch. The ruggedized placard may be subjected to heat and pressure for periods ranging from of 30 to 120 seconds.

A method of preparing a ruggedized placard for use on a curved surface, the method comprising the steps of: providing a cover layer cut from a sheet of cell-cast PMMA having a thickness in the range of 0.025 to 0.035 inches, 1 to 2 percent molecular cross-linking, and formulated with an additive absorbing 95 percent or more of incident ultraviolet light; during the cell cast process, embossing a fine grain pattern finish on an outer surface of the cover layer such that the finish measures 75 to 80 gloss units (GU); building up an indicia layer on the cover layer inner surface, the indicia layer including a first colorant coating and a second colorant coating that is opaque, the first colorant coating applied directly to portions of the cover inner surface to form alphanumeric characters or symbols for viewing through the clear cover; coating with the second colorant portions of the cover inner surface not coated with the first colorant; applying a mounting adhesive atop the indicia layer; and, applying the placard to curved mounting surface by bending the placard to conform to the surface such that the mounting adhesive comes into contact with and adheres to the curved mounting surface.

The above method may further comprising the step of preforming the placard before mounting wherein the placard is bent around a mandrel with curvature similar to that of the mounting surface and subjected to heating at a temperature that is 5 to 10 percent below the PMMA glass transition temperature.

BRIEF DESCRIPTION OF THE DRAWINGS

The present invention is described with reference to the accompanying figures. These figures, incorporated herein and forming part of the specification, illustrate some embodiments of the invention and, together with the description, further serve to explain its principles enabling a person skilled in the relevant art to make and use the invention.

DETAILED DESCRIPTION OF PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the terms "coupled" and "attached" include direct and indirect connections. Moreover, where first and second devices are coupled or attached, intervening devices including active devices may be located therebetween.

Figure 1:
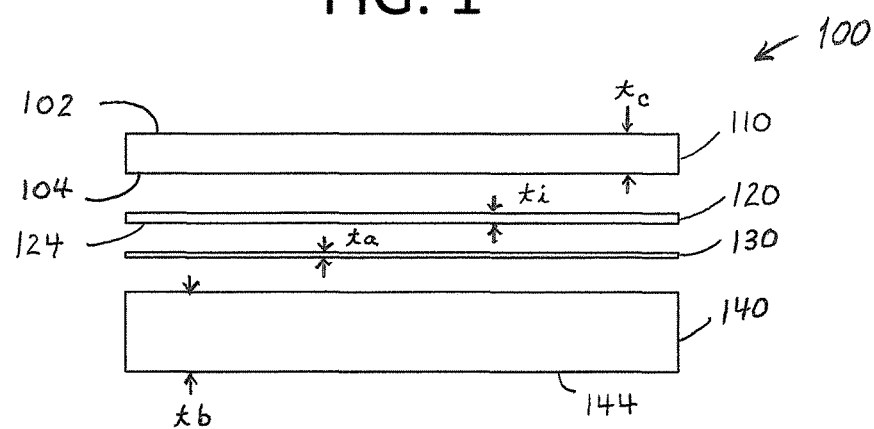
FIG. 1 shows a ruggedized placard exploded view in accordance with the present invention.
Figure 2:
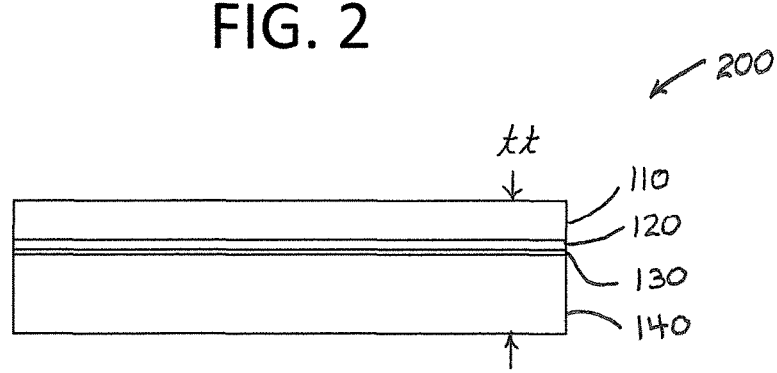
FIG. 2 shows an assembly view of the ruggedized placard of FIG. 1.

FIGS. 1-2 illustrate layers of a ruggedized placard of the present invention 100. In FIG. 1, the placard view is an exploded view 100. In FIG. 2, the placard view is an assembly view 200. As shown, an indicia layer 120 is located beneath a cover layer 110. An optional backing layer 140 may be included and may be coupled or affixed to the cover and/or indicia layer via an adhesive film layer 130. Where a backing layer is used, an adhesive may be applied to the exposed surface of the backing layer 144 for affixation of the placard to a mounting surface. As seen in the assembled view of FIG. 2, the total thickness of the assembly including the backing layer is "tt." Where no backing layer is used, the adhesive layer 130 may be included or not. Where included, the adhesive layer may be used for affixation of the placard to a mounting surface.

The cover layer 110 has an inner surface 104 and an outer viewable surface 102. Materials of construction include or may be limited to an optically clear plastic such as polymethylmethacrylate ("PMMA") or polycarbonate ("PC"). In some applications, PMMA may prove to be a more suitable cover 110 material than PC given its high light transmission characteristics, scratch resistance, and resistance to lap shear forces resulting from bending.

Cover thicknesses "tc" may be in the range of 0.010 to 0.125 inches and may be as large as one inch. In some embodiments, cover 110 thickness tc is limited to 0.035 inches or less, plus or minus an industry manufacturing tolerance of +/−15%, for example where curved surface mounting is desirable. Further, as thickness is reduced, so too is internal reflectance, a phenomenon that distorts and/or hinders readability of indicia 120 below the cover.

In an embodiment, the cover layer is made from molecular cross-linked PMMA that is cell cast. Cross linking may be in the range of 1 to 2% to improve ductility, reduce yield stress, and elevate glass transition temperature. Although better known extrusion manufactured PMMA provides a lower cost product, cell cast PMMA offers benefits including high light transmission characteristics (e.g., 92%), machining or cutting compatibility, low mass with high flexibility at thin cross-sections, dimensional stability, improved surface hardness/scratch resistance, less low angle distortion, a greater range of available thicknesses, and better chemical resistance.

The cover surfaces 102, 104 may be treated to provide clarity, long term clarity, glare management, resistance to scratching, and resistance to defacement as by graffiti.

Concerning clarity and long term clarity, cover 110 ultraviolet light ("UV") protection may be provided by suitable PMMA additives such as UV absorbing dyes and/or pigments. For mitigating yellowing due to sunlight, particular attention may be given to absorption of incident ultraviolet spectral irradiance in the 200 nm to 400 nm portion or 290 nm to 350 nm portion of the electromagnetic spectrum may mitigates yellowing due to sunlight exposure. Absorption of 95% or more of the UV in these bands may be accomplished using selected PMMA additives including one or more of CGX UVA 006 by BASF, triazines such as hydroxyphenyltriazine (HPT) (e.g., Tinuvin® 1577), benzotriazoles, benzophenones, and cyanoacrylates.

In some embodiments, the cover includes a glare management feature. For example, the cover outer surface 102 may be chemically etched or mechanically deformed to form a fine randomized surface grain. Anti-glare features may include a micro pattern or roughened surface to break up the light reflected from the surface. This diffusion reduces the coherence of reflected images, defocuses the images, and reduces their interference with viewing of the intended image. In an embodiment, this fine surface grain in impressed into the cover 110 during the cell-casting process as by corresponding cell-casting mold features.

In an embodiment, a surface grain design and/or grain size limit of the pattern provides an effective glare management range of 75-80 GU with a measurement angle of 20 degrees and/or using ASTM D523 1999 (USA). Notably, other management ranges provided by, among other things, other grain sizes may be used. For example, grain size may be increased so long as the indicia viewable through the cover 110 remain distinct and without undesirable aberration resulting from a grain size that is overlarge.

Features for resistance to defacement of the cover 110 outer surface 102 may be provided. For example, sacrificial or permanent coatings may be used to resist undesirable adherents and/or ease the removal of graffiti. Sacrificial coatings are removable, along with defacement such as graffiti. Suitable sacrificial polymers are optically clear and comprise weakly bonding polymers such as acrylates and biopolymers.

Permanent coatings include release agents for removal of undesirable adherents while the coating remains intact. Permanent coatings include silicone, polyurethane, and sol-gels with nano silica particles.

In an embodiment, a silicone based release coating is applied to the outermost surface 102 of the cover 110 to resist permanent attachment of undesirable adherents. See for example QSil 602 by Quantum Silicones. Yet another means for resisting defacement of cover surfaces 110 is through the use of PMMA additives. For example, in some applications the additive siloxane may be used.

The indicia layer 120 provides symbols that are viewed through the clear cover 110. The indicia layer may be formed by sheet stock such as papers and polymers or may be formed by a coating system such as a pigmented binder applied to the inner surface 104 of the cover.

In various embodiments, the indicia layer includes a plurality of colorants and/or colorant coatings. A first colorant may be applied directly to the cover layer inner surface 104, as in the application of alphanumeric characters or symbols, and additional colorants may be applied to portions of the inner surface not covered by the first colorant. In some embodiments, the first colorant is overcoated by the second colorant.

Figure 3:
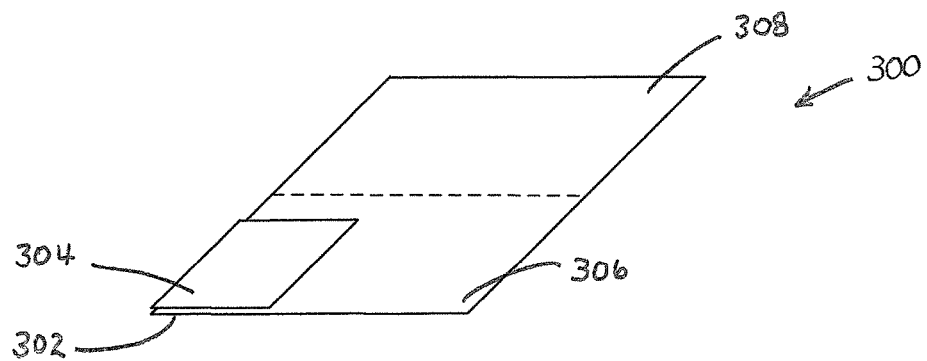
FIG. 3 shows an indicia layer of the ruggedized placard of FIG. 1.

As shown in FIG. 3, an indicia layer 300 may comprise multiple overlapping plys 302, 304 and/or multiple non-overlapping zones 306, 308. Further, the indicia layer need not be coterminous with the cover 110 inner surface 104.

Indicia layer 120 materials or colorants suitable for coating the cover inner surface 104 include inks, paints, and the like. Inks may be applied to an image carrier such as a screen and transferred to a substrate such as the cover inner surface. Inks may also be applied by a print head similar to the print head used in an ink jet or digital printing process. Paints may be applied to the cover inner surface by a suitable traditional means including transfer from a brush, roller, or spray nozzle. In an embodiment, indicia are formed using digitally printed media that is cured with ultra violet light.

Coating materials include those suited for application to PMMA. For example, coatings may be acrylic based and/or utilize binders including one or more of acrylic resins, polyvinyl acetate, polyvinyl alcohol, polyamide resins, and polyurethane resins.

The thickness "ti" of the indicia layer 120 may be relatively thin as compared to the thickness "tc" of the cover layer. In some embodiments the indicia layer or at least portions of the indicia layer may have a thickness in the range of approximately 0.010 to 0.015 inches to i) promote light transmission through the layer and ii) maintain sufficient opacity such that reflection of incident light provides sufficient contrast for ready observation of the indicia through the cover 110.

In some embodiments, contrast may be determined from the relationship Contrast=[(B1−B2)/B1]×100% where B1=light reflectance value (LRV) of the lighter area and B2=light reflectance value (LRV) of the darker area. Note that LRV is determined in accordance with ASTM C609-07(2014). Sufficient contrast may be in the range of 60 to 100%. Sufficient contrast may be 60%, 70%, 75%, 80%, 85%, 90% or 95% depending upon the application. For example where only a brief timespan may be available to an observer, higher contrast values may be selected such as 85%, 90% or 95%.

The adhesive layer 130 may be coterminous with the cover layer 110 and/or the adhesive layer may cover part or all of the indicia layer. Suitable adhesive materials are those compatible with the chosen indicia layer 130 and/or cover layer 120 and/or backing layer 140. In an embodiment, an acrylic adhesive such as an optically clear acrylic adhesive is used. Adhesives such as acrylic film adhesives and optically clear acrylic film adhesives may be used. Adhesive chemistries similar to those of 3M™ Optically Clear Adhesives 8211-15 may be used. Adhesive thicknesses "ta" may be in the range of 0.001 to 0.005 inches.

The backing layer 140 may be coterminous with the cover layer 120 and/or the backing layer may cover all or more than all of the indicia layer 120. Backing materials include any suitable metal or plastic. For example, PMMA or PC may be used. Whether an optically clear or translucent material is desirable or not depends upon the application. For example, where the placard will be backlighted, optically clear or translucent materials may be used. For example, where no backlighting is used and it is desirable for the cover layer 110 to hold a curved shape after bending, a metal backing may be used.

During construction of the ruggedized placard 100, the backing layer may be joined with an assembly of the cover and indicia layers 110, 120 via an adhesive film layer 130.

In the mentioned joining process, coadhesion of the indicia layer(s) 120 and backing layer 140 may be improved through use of an elevated temperature and pressure. For example, heating the parts to a temperature in the range of 160 to 180 degrees Fahrenheit and evenly applying mechanical pressure to press the parts together with a pressure of about 30 to 70 pounds per square inch during a period of approximately 50 to 70 seconds provides a strong and substantially continuous bonding plane between the indicia layer and the backing layer after the ruggedized placard assembly 100 has cooled to a temperature below 120 degrees Fahrenheit. In an embodiment, the bonding temperature is 170 degrees Fahrenheit, the pressure applied is 50 pounds per square inch, and the time duration of elevated temperature and applied pressure is 60 seconds. Notably, bending the placard while its temperature is elevated and during a cooling time thereafter provides a means for "setting" a particular shape or curvature in the placard.

Backing thickness or a minimum backing thickness "tb" may be chosen as a multiple of cover thickness tc, for example a multiple of about two or more. Backing thickness may also be chosen according to the intended use of the ruggedized placard 100. For example, where increased placard rigidity is desired, a relatively thick backing thickness may be chosen, for example in the range of 0.25 inches or greater. For example, where placard flexibility is desired, as for following a contoured or rounded surface, a relatively thin backing thickness may be chosen, for example in the range of cover thickness tc to 0.25 inches.

Applicant notes that as described above, the backing layer 140 is not required or even desirable in some applications. For example, placard 100 flexibility is improved when there is no backing layer that further stiffens the placard. Flexible placards used as decals that conform to a substrate that is other than flat, curved for example, may exclude the backing layer. Such embodiments may utilize an appropriate adhesive applied to the indicia layer 120 inner surface 124 for mounting the placard.

Embodiments of the placards 100 described herein provide a ruggedized means of presenting a message to observers. In various embodiments they may be drilled, cut, shaped, and polished to suit diverse applications.

Figure 4:
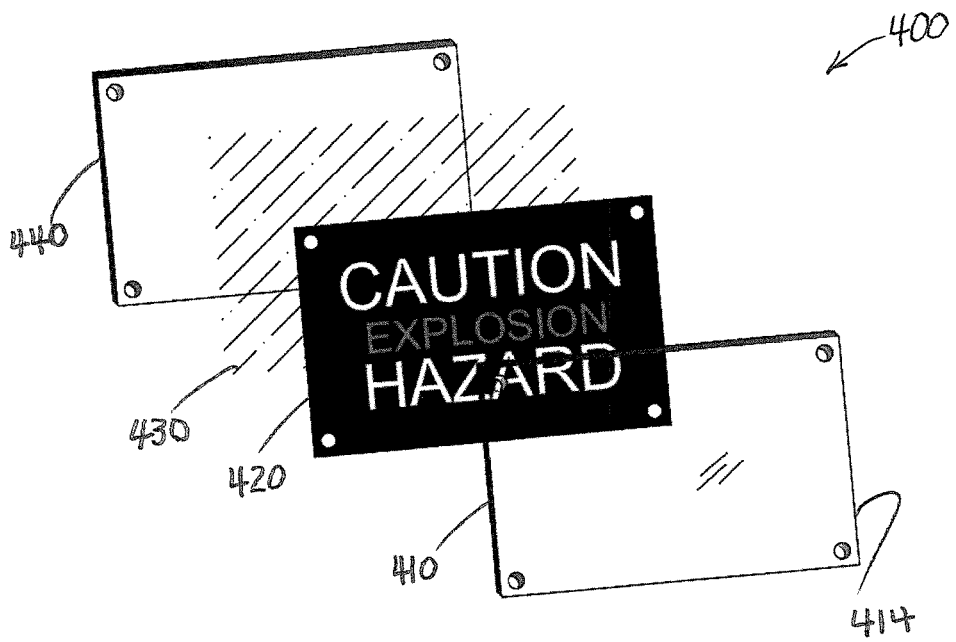
FIG. 4 shows an exploded colorized view of an exemplary ruggedized placard.
Figure 5:
FIG. 5 shows a colorized assembly view of the ruggedized placard of FIG. 4.

FIGS. 4-5 show an exploded view and an assembled view of an exemplary ruggedized placard 400, 500. The placard is a stacked assembly including a clear cover layer 410, a multicolored indicia layer 420, an adhesive film layer 430, and a backing layer 440.

Here, the indicia layer 420 includes multiple plys and or zones presenting the message CAUTION in yellow, EXPLOSION in red, and HAZARD in yellow. In an embodiment, the inner side 414 of the cover 410 first receives digitally printed characters forming the words CAUTION and HAZARD in yellow and forming the word EXPLOSION in red. After the words are formed, an opaque (e.g., black) flood coat may be applied. In the alternative, the opaque coating may be selectively applied so as to leave the originally applied characters uncoated such that backlighting may illuminate the characters.

The present invention has been disclosed in the form of exemplary embodiments. However, it should not be limited to these embodiments. Rather, the present invention should be limited only by the claims which follow where the terms of the claims are given the meaning a person of ordinary skill in the art would find them to have.

What is claimed is:

1. A ruggedized placard constructed with a cover layer and an indicia layer for use in physically abusive environments, the placard comprising:
   a clear cover layer having a continuous thickness in the range of 0.025 and 0.035 inches;
   an indicia layer coextensive with the cover layer;
   the cover layer having opposed inner and outer surfaces and cut from a sheet of cell-cast polymethylmethacrylate (PMMA);
   the cover layer having a thickness in the range of 0.025 to 0.035 inches and embossed with a fine grain pattern finish on an outer surface of the cover layer that measures 75 to 80 gloss units (GU); and,
   the PMMA 1% to 2% molecular cross-linked and formulated with additives including one or more of triazines and cyanoacrylates to absorb 95 percent or more of incident ultraviolet light;
   wherein the indica layer includes a first ink colorant transferred from a screen to coat the cover layer inner surface to form alphanumeric characters or symbols for viewing through the clear cover and wherein the indicia layer includes a second opaque colorant to coat portions of the inner cover surface that are not coated with the first colorant.

2. The ruggedized placard of claim 1 further comprising a backing layer directly adhered to the indicia layer by an acrylic film adhesive.

3. The ruggedized placard of claim 2 wherein mechanical pressure holds the placard layers together.

4. The ruggedized placard of claim 3 wherein the mechanical pressure is between about 40 pounds per square inch and about 60 pounds per square inch.

5. The ruggedized placard of claim 4 wherein the time of application of heat and pressure is in the range of 30 to 120 seconds.

6. The ruggedized placard of claim 3 wherein a placard temperature 5 to 10 percent below the PMMA glass transition temperature provides desired properties.

7. The ruggedized placard of claim 1 further comprising:
   a mounting adhesive applied to the indicia layer; and,
   the placard applied to a curved mounting surface by bending the placard to conform to the surface such that the mounting adhesive comes into contact with and adheres to the curved mounting surface.

8. The ruggedized placard of claim 7 wherein the placard is preformed such that it may be mounted with a mandrel having a curvature similar to that of the curved mounting surface.

9. The ruggedized placard of claim 8 wherein the placard experiences a temperature that is 5 to 10 percent below the PMMA glass transition temperature.

10. The ruggedized placard of claim 1 wherein the PMMA molecular cross-linking is 1 percent molecular cross linking.

11. The ruggedized placard of claim 1 wherein the indicia layer that is printed onto the cover layer inner surface is screen printed.

12. A ruggedized placard constructed with a cover layer and an indicia layer for use in physically abusive environments, the placard comprising:
   a clear cover layer and an indicia layer that is coextensive with the cover layer;
   the cover layer having opposed inner and outer surfaces and cut from a sheet of cell-cast polymethylmethacrylate (PMMA);
   the cover layer having a thickness in the range of 0.025 to 0.035 inches and embossed with a fine grain pattern finish on an outer surface of the cover layer that measures 75 to 80 gloss units (GU); and,
   the PMMA is 1 to 2 percent molecular cross-linked and formulated with additives that absorb 95 percent or more of incident ultraviolet light;
   wherein the indica layer is printed onto the cover layer inner surface to form alphanumerics for viewing through the cover and an opaque colorant is applied to portions of the cover layer inner surface that are not coated with the first colorant.

* * * * *